(12) United States Patent
Ruffini

(10) Patent No.: US 6,532,274 B1
(45) Date of Patent: Mar. 11, 2003

(54) SYNCHRONIZATION METHOD AND ARRANGEMENT

(75) Inventor: Stefano Ruffini, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/480,182

(22) Filed: Jan. 11, 2000

(30) Foreign Application Priority Data

Jan. 12, 1999 (SE) ................................................ 9900053

(51) Int. Cl.⁷ .................................................. H04L 7/00
(52) U.S. Cl. ........................................ 375/356; 375/362
(58) Field of Search ................................. 375/356, 362, 375/364, 354, 376; 370/503, 516, 520; 713/400, 500, 501, 502, 503

(56) References Cited

U.S. PATENT DOCUMENTS

| | | | | |
|---|---|---|---|---|
| 5,249,206 A | * | 9/1993 | Appelbaum et al. | 375/356 |
| 5,450,394 A | * | 9/1995 | Gruber et al. | 370/253 |
| 5,473,640 A | * | 12/1995 | Bortolini et al. | 375/376 |
| 5,822,383 A | * | 10/1998 | Muntz et al. | 375/362 |

FOREIGN PATENT DOCUMENTS

| | | |
|---|---|---|
| EP | 0 705 000 A2 | 4/1996 |
| EP | 0 838 916 A1 | 4/1998 |
| SE | 508 460 | 10/1998 |
| WO | WO 98/13966 | 4/1998 |
| WO | WO 98/13969 | 4/1998 |

OTHER PUBLICATIONS

International Search Report Date of Completion: Dec. 9, 1999; Date of Mailing: Dec. 15, 1999.
Proceedings of the *Twelfth Real–Time Systems Symposium*; pp. 22–31; Dec. 4–6, 1991; San Antonio, Texas.
Conference record of the *1997 IEEE International Conference on Communications*; pp. 490–494; Jun. 8–12, 1997; Montréal, Québec, Canada.
American National Standard for Telecommunications—Synchronization Interface Standard, ANSI T1.101–1994, pertinent pages.
Draft American National Standard for Telecommunications—Synchronization Interface Standard, ANSI T1.101–199X, 1994, pertinent pages.

* cited by examiner

*Primary Examiner*—Phuong Phu

(57) ABSTRACT

The present invention relates to a method and to an arrangement for synchronising at least one local oscillator (21) with a central time-generating unit (11). The local oscillator (21) serves a so-called element (2) included in a network (A), and the time-generating unit (11) is included in a so-called main unit (1) also included in the network (A). The frequency of the local oscillator (21) can be controlled by periodic and automatic calibration. The physical requirements within a part of the network (A) that includes the main unit (1) and all elements (2, 3, 4) concerned, said part being referred to here as a limited network (B), are so well defined that the transmission time of a time stamp from the main unit (1) to an element (2) will be known with a given degree of certainty. The inter-arrival time of the time stamps is used to calibrate the local oscillator (11) together with the known transmission time.

40 Claims, 4 Drawing Sheets

SYNCHRONIZATION METHOD AND ARRANGEMENT

This application claims priority under 35 U.S.C. §§119 and/or 365 to 9900053-1 filed in Sweden on Jan. 12, 1999; the entire content of which is hereby incorporated by reference.

FIELD OF INVENTION

The present invention relates to a method and to an arrangement for synchronising at least one local oscillator with a central time-generating unit. The local oscillator serves a so-called element included in a network, and the time-generating unit is included in a so-called main unit, which is also included in the network.

The frequency of the local oscillator can be controlled by periodic and automatic calibration.

DESCRIPTION OF THE BACKGROUND ART

It has long been known that nodes or elements belonging to a telecommunications network need to be synchronised with a common time reference. This is particularly important in respect of telecommunications networks that serve mobile telephones, where one and the same time reference must be used between different base stations in order for a user to be able to move without hindrance between the areas covered by said base stations during an ongoing communication.

It has become more and more usual in recent times to use in telecommunications networks transmission media and transport techniques that although novel with respect to telecommunications have been used earlier for the transmission of data, for instance.

The problem encountered when using new transport techniques is one of transferring synchronisation from the core of the network to its peripheral borders. The physical medium and the protocol used are not always suitable for the transference of synchronisation. A typical example in this respect is the use of Internet Protocol (IP) technique between base stations and Base Station Controllers (BSC) in mobile telecommunications networks.

Known solutions to these problems are found in the use of autonomous clocks or in clocks that are locked to an available navigational system, such as the Global Positioning System (GPS).

For reasons of cost, autonomous clocks are normally comprised of quartz oscillators. These clocks, however, require periodic manual calibration in order to be able to generate a time reference signal within set requirements.

It is also known that oscillators can be controlled automatically with respect to frequency without requiring manual work, by automatically assigning to the oscillator a correction value in accordance with a given periodicity. One example of oscillators that can be controlled automatically are voltage-controlled oscillators with which a voltage level determines the frequency of the oscillator. In the case of an oscillator of this kind, it is possible to calibrate and adjust the oscillator periodically and automatically, by controlling the voltage level in question. However, this requires a relevant correction value to be given, i.e. a voltage level that corresponds to the frequency to which the oscillator shall be set. Accordingly, the expression "the frequency can be controlled by periodic and automatic calibration" used in this description of the present invention refers to an oscillator that can be controlled frequency-wise by setting a signal, such as a voltage level, to a specific value in the absence of manual work.

It is not always possible to use the GPS, because it is not always possible to receive requisite signals, such as in the case of underground base station installations. The use of the GPS may also be impractical purely for cost reasons.

The problems of transferring a synchronising reference signal can be divided into two separate groups. Firstly, it may be necessary for an absolute time to be known, i.e. the time of day (ToD), and secondly a local oscillator may be required to oscillate at the same frequency as a specified reference frequency within a given error tolerance. The present invention relates mainly to this latter problem, in other words to the possibility of allowing the oscillators active in the network to oscillate at a common frequency.

Listed below are prior publications, which describe various solutions to problems that can occur within this particular technical field.

Publication EP-A1-0 838 916 teaches a method of synchronising a receiving node to the bit rate of incoming bits. A time stamp is allocated to a data packet arriving at a receiving buffer. When the data packet is read from the buffer, the time at which the data packet was read is compared with the time stamp and the time difference, i.e. the time between reading the data packet into the buffer and reading said data packet from said buffer provides a measurement of the number of data packets in the buffer.

The bit rate with respect to the receiving node is regulated in accordance with a desired number of data packets in the buffer. The bit rate is decreased when the number of data packets becomes too small and is increased when the number of data packets becomes too large. The local bit rate can be adjusted to be the same as the bit rate of the transmitting node in this way.

Publication U.S. Pat. No. 5,822,383 also describes a solution to the problem of synchronising a receiving node to the bit rate of a transmitting node.

Publication WO 98/13969 deals with the time of day problem. A good time reference is already found available through GPS signals to network nodes. Publications WO 98/13966 and SE-C2 508 460 also describe a solution in which all system nodes have access to a GPS signal.

In Proceedings: Twelfth Real-Time Systems Symposium, there is presented the article "Efficient Synchronization of Clocks in a Distributed System" by Sympath Rangarajan and Satish K. Tripathi, which describes the possibility of allocating different clocks in a system a common frequency that is based on a mean value of the different frequencies of the system clocks, by virtue of the different clocks in the system sending time stamps to one another and thereafter being synchronised to a common clock value calculated in accordance with a common statistical algorithm. The system clocks are synchronised in this way to a statistically calculated common frequency and not as slave clocks to a master clock.

A known method of synchronising a local oscillator with a central oscillator is to use time stamps, where a first time stamp is sent from the local oscillator to the central oscillator and a second time stamp is sent back in return. The information that is sent back includes information as to when the first time stamp was received and when the second time stamp was sent. The local oscillator can be synchronised with the central oscillator on the basis of the round-trip delay and on the basis of the information included in the second time stamp.

In the 1997 IEEE International Conference on Communications, there was presented an article "On Assessing Unidirectional Latencies in Packet-Switching Networks" by Andreas Fasbender and Ingo Rulands, which describe the possibility of synchronising a local oscillator with a centrally positioned oscillator on the basis of round-trip delay.

This article also describes the possibility of using a one-way delay in ascertaining whether or not the communications path between two units in a network is suitable for transmitting time information that is reliable from the aspect of synchronisation.

It should also be mentioned that in a proposal to an American standard designated ANSI T1.101-1994 "Draft American National Standard for Telecommunications—Synchronization Interface Standard", there are described and specified types of digital network interfaces that can transfer references for synchronisation and synchronisation specifications relating to reference signals in network interfaces between DS1 and SONET.

Section 8 of this publication describes how a local oscillator can be controlled to determine whether it maintains a specific quality standard for oscillators after a reference signal to the oscillator has been lost.

Oscillators can be divided into categories designated "Stratum", where Stratum levels, Stratum 1 to Stratum 4, denote the accuracy levels of the oscillators and where Stratum 1 denotes a highest level and Stratum 4 a lowest level. Each level can also be divided into sublevels in accordance with different alphabetical designations.

ANSI T1.101-1994 discloses computing algorithms for how relative frequency deviations and drifts of an oscillator can be computed and their respective limits with regard to the different Stratum levels.

SUMMARY OF THE INVENTION
Technical Problems

When considering the earlier state of the art as described above, it will be seen that in connection with a method or an arrangement where a local oscillator serves a so-called network element and where a time-generating unit is included in a so-called network main unit, and where the frequency of the local oscillator can be controlled by periodic and automatic calibration a problem resides in enabling the local oscillator to be synchronised with the central time-generating unit even when the network acting there between is unsuitable for or incapable of transferring the information required for direct synchronisation.

Another technical problem is to enable such information to be transferred solely by sending a periodic time stamp from the time-generating unit to the element concerned.

Another technical problem is one of providing a well-defined and repeatable transfer time for the transfer of a time stamp between the main unit and the element concerned.

Still another technical problem is one of sending between the main unit and the element concerned time stamps required for synchronisation, without interfering with other network traffic.

Another technical problem is one of enabling the arrival time of a time stamp at a receiving element to be safely evaluated statistically.

Yet another technical problem is one of finding a mathematical algorithm that enables calibration of a local oscillator with a starting point from measured intervals between the time stamps received by a network element.

Another technical problem is one of dividing a calibration process into different phases, where relevant time intervals are given for correct calibration and adjustment ment of the local oscillator.

Still another technical problem is one of adjusting a local oscillator when the signal from the time-generating unit is lost.

A further technical problem is one of adjusting a local oscillator in accordance with a received calibration value.

Yet another technical problem is one of evaluating a local oscillator that has been newly installed, during an initiation interval so as to be able to obtain quickly features that are characteristic of the newly installed local oscillator.

Another problem is one of being able to provide an element that includes a newly installed local oscillator with necessary information for enabling this element to avail itself of the advantages afforded by the invention.

A further technical problem resides in synchronising a local oscillator with respect to absolute time, i.e. ToD, in addition to synchronising a local oscillator with respect to frequency deviations and correcting the oscillator in this regard.

Another technical problem is one of being able to relieve respective elements from requisite calculations or computations and the hardware and software required to this end in connection with the calibration of a local oscillator.

Yet another technical problem is one of providing a suitable reference for the central time-generating unit.
Solution With the intention of solving one or more of the aforesaid technical problems, the present invention takes its starting point from a method or an arrangement for synchronising at least one local oscillator with a central time-generating unit, where the local oscillator serves a so-called network element, where the time-generating unit is included in a so-called main unit also included in the network, and where the frequency of the local oscillator can be controlled by periodic and automatic calibration. That part of the network operative between the main unit and respective local elements is either unsuitable for or incapable of transferring information required for direct synchronisation of the local unit.

The invention relates to both a method and an arrangement. These are described separately in the following description of embodiments at present preferred while both the method and the arrangement are described more comprehensively and in common in this description of the solution.

With the intention of enabling the local oscillator to be synchronised with the main unit regardless of the deficiencies of the network operating there between, it is proposed in accordance with the invention that the time-generating unit sends a time stamp at pre-defined time intervals, that the physical conditions within that part of said network which includes said main unit and said element, here referred to as a delimited network, are so well defined that the transfer time of a time stamp from the main unit to respective elements is known to respective elements with a given degree of certainty, and that the mutual arrival times of received time stamps are used together with the known transfer time to calibrate the local oscillator.

A well-defined and repeatable transfer time between the main unit and respective elements can be provided by giving the time stamps the highest priority over all other information transmissions within the delimited network.

According to the present invention, the time stamps shall be transmitted to all elements within the delimited network in a general broadcast.

With the intention of enabling the arrival time of a time stamp to be guaranteed statistically, it is proposed in accordance with the invention that a group of time stamps are transmitted with each transmission within a short time interim of one another, such as three mutually sequential time stamps at one-second intervals.

The present invention provides a mathematical method in which the variation of the time stamp arrival times is used for said calibration, and where these variations are described in a time error which constitutes the difference between the pre-defined, and therewith expected, time interval and the actual time interval between received time stamps measured by the local oscillator.

This time error can be divided into an oscillator-dependent component and a network-dependent component, where the oscillator-dependent component is determined by the characteristic of the local oscillator and the network-dependent component is determined by the variations in transmission times from the time-generating unit to the element for respective time stamps and any possible measuring error in the measuring method used.

An evaluating period for calibrating a local oscillator is divided into a first phase and a second phase, where the first phase continues at least until the network-dependent component no longer has any deleterious affect on the calculation of the relative frequency deviation with respect to the local oscillator, and where the second phase is commenced immediately after the first phase.

The second phase includes continuous evaluation of the time error and is terminated with calibration and adjustment of the local oscillator.

According to the present invention, the second phase is terminated before the relative frequency deviation of the local oscillator has reached a maximum accepted relative frequency deviation.

Alternatively, the second phase may be terminated prior to the time error reaching a predetermined value that is smaller than or equal to a maximum accepted time error.

The mathematical method used includes an evaluation of the relative frequency deviation of the local oscillator in accordance with the formula $$Y = \frac{0.006}{N\tau_0} \sum_{i=1}^{N} TE_i \left( \frac{2i}{N^2-1} - \frac{1}{N-1} \right)$$

where Y is the relative frequency deviation, N is the number of time stamps received, $\tau_0$ is the time interval between transmitted time stamps, $TE_i$ is the time error in respect of received time stamps, and $N\tau_0$ is thus the time duration of the second phase.

It is proposed that the time stamps are sent at intervals of 15 minutes to 4 hours, such as with a one-hour interval. Other intervals are possible, and part of the criteria that control the choice of this interval will be discussed in the following description of preferred embodiments.

With the intention of enabling the local oscillator to be corrected even when the time stamps are lost, it is proposed that the frequency drift of this local oscillator is evaluated and that said drift is used to correct the local oscillator when the time stamps from the central time-generating unit are lost.

According to the present invention, this drift can be evaluated by the following formula:

$$D = \frac{0.06}{M\tau_1^2} \sum_{j=1}^{M} TE_j \left( \frac{\frac{6j^2}{M^4 - 5M^2 + 4} - \frac{6j}{M^3 - M^2 - 4M + 4} +}{\frac{1}{M^2 - 3M + 2}} \right)$$

where D is the drift of the local oscillator, M is the number of time stamps, $\tau_1$ is the time interval between transmitted time stamps, and $TE_j$ is the time error of respective time stamps.

The results of different calibrations may be stored, thereby obtaining a characteristic value of the drift of the local oscillator for use in adjusting the oscillator in the event of the time stamps from the central time-generating unit being lost.

With the intention of enabling a newly installed local oscillator to be evaluated, it is proposed in accordance with the invention that there is used during an initiation interval for the new local oscillator a time interval between transmitted time stamps that is much shorter than the time interval between transmitted time stamps in a calibrating process.

This time interval may be 10 seconds and the initiating interval may be 30 minutes.

According to the invention, these time stamps can be ordered through a request from the element that includes the new oscillator to the main unit stating a desired time interval, desired initiating interval, etc.

When initiating a new oscillator, it is possible to allow the main unit to send necessary parameters to the element that includes the new oscillator, such as anticipated time intervals between transmitted time stamps, the time duration of the first phase, the time duration of the second phase, and possibly other parameters, so as to enable the local oscillator to partake of synchronisation according to the present invention.

With the intention of subjecting the delimited network to the smallest possible load, it is proposed in accordance with the invention that the information part of the time stamps includes solely the information required to recognise a time stamp and any information in order to ensure transmission of the time stamp over the delimited network.

It is also possible to allow the time stamps to include information relating to absolute time, whereby determination of the Time of Day (ToD) is enabled.

In order to achieve a high degree of accuracy in determining ToD, the present invention may be combined with any method that functions in accordance with the Round Trip Delay principle, such as Network Time Protocol.

With the intention of relieving respective elements from the load required when calculating the frequency deviation of the local oscillator, it is proposed in accordance with the invention that respective elements collect requisite calibration information during the second phase, and that these elements send this information to the main unit and that the main unit performs the calculations, or computations, necessary to obtain a value for calibrating the local oscillator, and that the main unit sends to the element concerned a local oscillator adjustment value, and that this element performs the necessary adjustment.

According to the present invention, the time-generating unit may include a GPS receiver whereby the time stamp time reference is obtained.

Advantages

Those advantages that are primarily characteristic of a method and an arrangement according to the invention reside in enabling local oscillators to be synchronised with a main unit over a network regardless of the properties of said network. For instance, this enables a network constructed for IP (Internet Protocol), which is not suitable for direct transmission of synchronisation information, to be used for mobile telecommunication, such as GSM, which requires good synchronisation between system base stations.

The primary characteristic features of a method according to the present invention are set forth in the characterising clause of the accompanying claim 1, while the main characteristic features of an inventive arrangement are set forth in the characterising clause of the accompanying claim 23.

BRIEF DESCRIPTION OF THE DRAWINGS

A method and an arrangement having features characteristic of the present invention will now be described in more detail by way of example with reference to the accompanying drawings, in which.

DESCRIPTION OF EMBODIMENTS AT PRESENT PREFERRED

Figure 1:
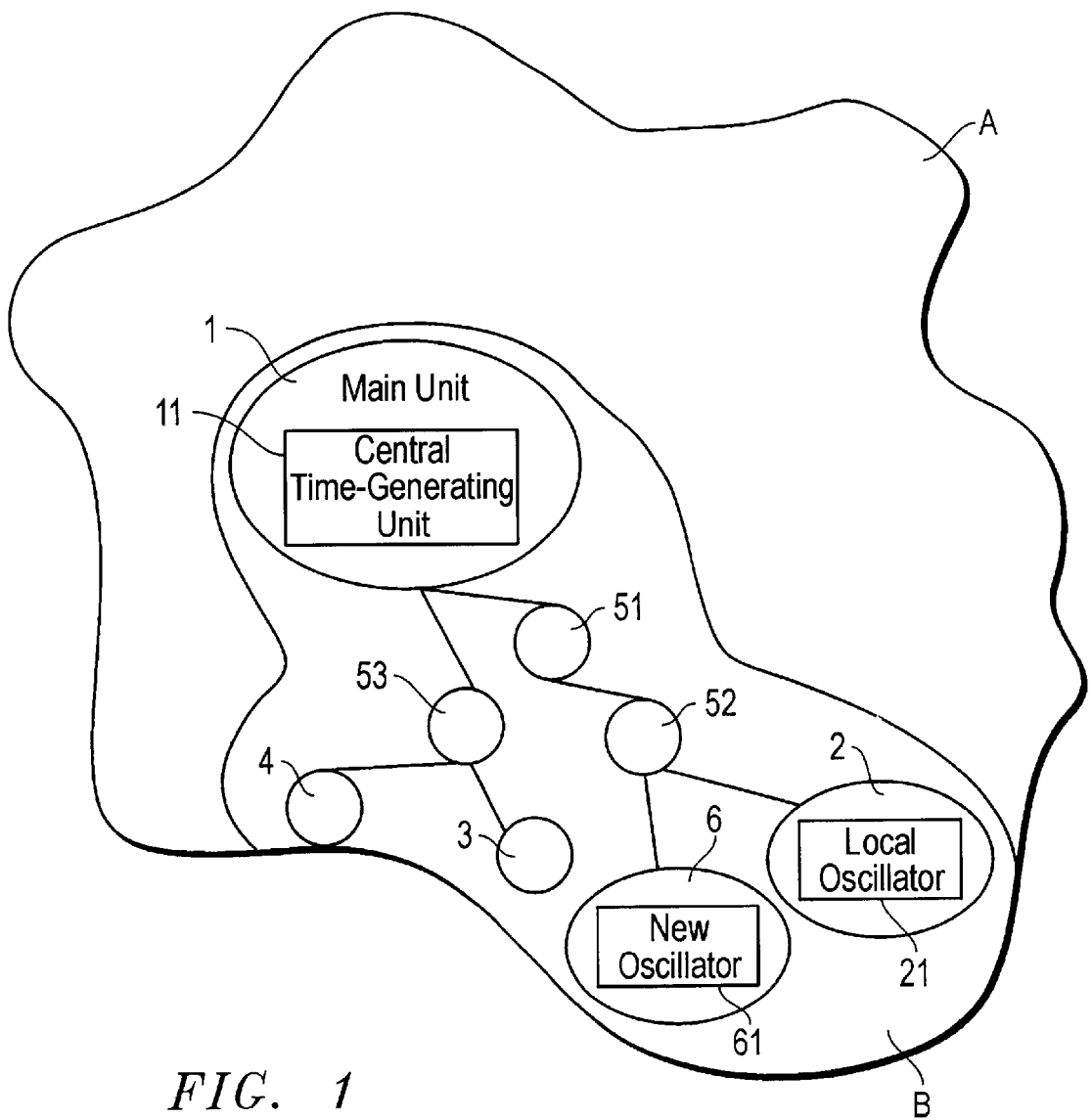
FIG. 1 is a highly simplified schematic illustration of a network that includes a main unit, elements and nodes.
Figure 2:
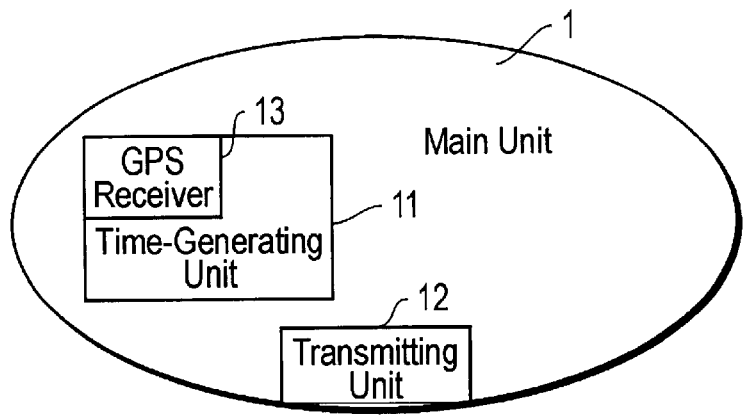
FIG. 2 is a schematic illustration of a main unit.
Figure 3:
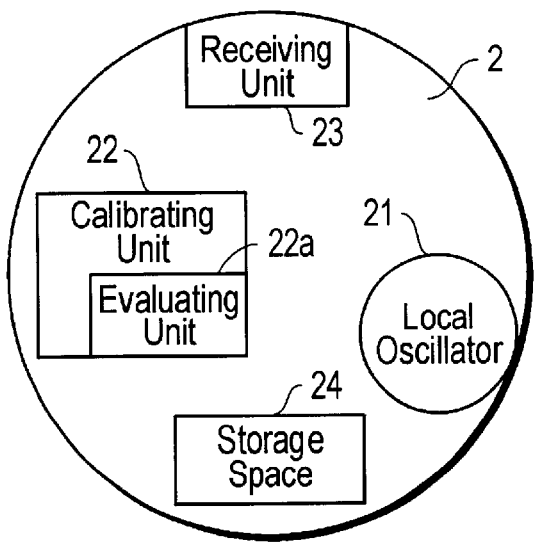
FIG. 3 is a schematic illustration of an element.

FIG. 1 illustrates a method of synchronising at least one local oscillator 21 belonging to an element 2 with a central time-generating unit 11 belonging to a main unit 1. The main unit 1 is shown more clearly in FIG. 2, whereas the element 2 is shown more clearly in FIG. 3.

The local oscillator 21 serves the so-called element 2 and the time-generating unit 11 is included in the so-called main unit 1, which are both included in the network A. The network also includes other elements 3, 4, which also include local oscillators that obtain requisite synchronisation information from the main unit 1, and other nodes 51, 52, 53. It will be understood that the network A may also include further nodes, although these have not been shown because they have no decisive function with respect to the present invention.

By network is meant a network of nodes that mutually interact through some type of communication. This communication can be achieved through electric signals in lines intended for this purpose, optical signals in lines intended for this purpose, or electromagnetic signals via wave-guides or via the free atmosphere. Although the description is given with reference to line-bound electric signals by way of example, it will be obvious to the person skilled in this art that the present inventive concept can also be applied with other transmission techniques.

Certain nodes have also been allocated specific designations in the following description, with the intention of enabling the present invention to be understood more easily, wherein a node having a time reference for synchronisation is designated a main unit and wherein nodes that include local oscillators to be synchronised with the main unit are designated elements.

With the intention of simplifying the description, only one of the elements will be described in such detail as that required to understand its function in relation to the present invention, although it will be understood that further elements that receive synchronisation information from the main unit are able to do so in accordance with the present description of the inventive concept.

It is also possible for elements to receive synchronisation information in accordance with some other method and there is nothing to prevent the described method and the described arrangement being combined with other methods and/or arrangements for synchronising given elements included in the network.

The central time-generating unit 1 includes an oscillator that has a reliable reference frequency and which shall be used as a reference for the synchronisation of the local oscillator 21.

Because of the nature of the network A, the transmission medium between the main unit 1 and the elements 2, 3, 4 that are dependent on the main unit for synchronisation information is unsuitable for direct transmission of such information.

The frequency of the local oscillator 21 can be controlled by periodic and automatic calibration.

Figure 4:
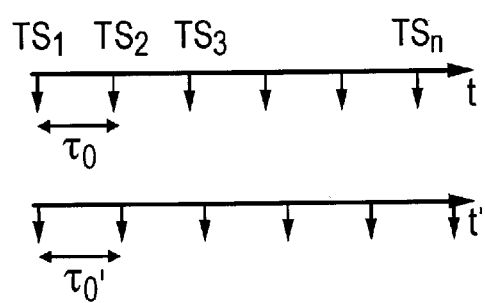
FIG. 4 illustrates schematically the variation between transmitted time stamps and received time stamps.

With a starting point from such a system, it is proposed in accordance with the present invention that the time-generating unit 11 sends a time stamp TS at predefined time intervals $\tau_0$ in accordance with FIG. 4, said time stamp TS being transmitted through a general transmission, i.e. is broadcasted to all elements 2, 3, 4 within a part of the network that includes the main unit 1 and the elements 2, 3, 4, said part being referred to as a delimited network B in this document.

According to the present invention, the physical conditions within this delimited network B are so well defined that the transmission time of the time stamp TS from the main unit 1 to respective elements 2, 3, 4 will be statistically known to respective elements with a given degree of certainty.

According to the inventive concept, the mutual arrival times of the time stamps are used together with the known transmission time to calibrate the local oscillator 21.

The time stamp transmission times may be well known because said time stamps have been given the highest priority over all other information transmissions within the delimited network B. This means that other nodes 51, 52, 53 in the network B will forward time stamps $TS_1$, $TS_2$, $TS_3$, ..., $TS_n$ transmitted from the main unit 1 immediately to the various units 2, 3, 4 in the absence of any waiting time in respective nodes 51, 52, 53. By waiting time is meant waiting for other traffic, although there will be a certain delay when handling forwarding of the time stamp at each node that shall forward a time stamp. However, this delay forms part of the transmission time that is known with a certain degree of certainty.

Thus, the time stamps $TS_1$, $TS_2$, $TS_3$, ..., $TS_n$ are given priority over any waiting information, even if this information should concern speech transmission, such transmission being given the highest priority in certain networks. This enables each individual element 2, 3, 4 to predict with great accuracy the transmission time for a time stamp $TS_1$, $TS_2$, $TS_3$, ..., $TS_n$ from the main unit 1 to the element 2.

According to the present invention, synchronisation is effected with the aid of a mathematical method adapted for calibrating oscillators in which the variation of said time stamp arrival times is used for the actual calibrating process.

This variation is described in a time error TE which constitutes the difference between the pre-defined and therefore anticipated time interval $\tau_0$ and the actual time interval $\tau_0'$ between received time stamps $TS_1, TS_2, TS_3, \ldots, TS_n$ measured by the local oscillator 21.

The time error TE can be divided into an oscillator-dependent component TEo and a network-dependent component TEn. The oscillator-dependent component TEo is determined by the characteristic of the local oscillator 21 whereas the network-dependent component TEn is determined by the actual variations in transmission times of respective time stamps TS from the time-generating unit 11 to the element 2 and any measuring error in the measuring method used.

The network-dependent component TEn can be determined in different ways. For instance, it can be determined empirically from different measurements, while the oscillator-dependent component TEo is a characteristic parameter for used oscillators where the supplier of the oscillator discloses a highest value that can be managed by the oscillator.

The time dependency of the oscillator-dependent component can be described by the following formula, which gives the time error TEo after $\tau$ seconds:

$$TEo(\tau) = a\tau + 0.5\tau^2 + c \quad (1)$$

The parameter a describes an initial frequency deviation and a phase error resulting from temperature variations, parameter b states the oscillator frequency drift, and parameter c states phase jumps that can occur in transitions between different working modes of the oscillator. The formula shows that the time error increases quadratically with time.

Figure 5:
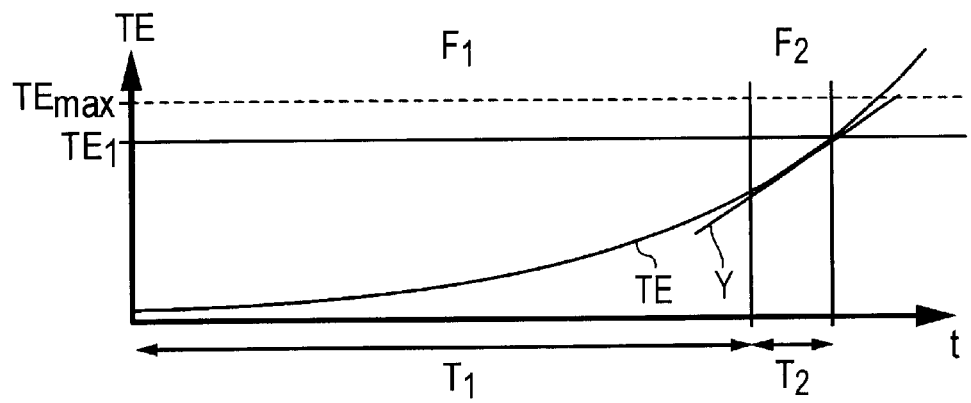
FIG. 5 is a diagrammatic illustration of time errors accumulated over different time periods.

This time dependency is also shown in FIG. 5, in which the total time error TE is shown.

The relative frequency deviation Y of an oscillator in relation to a nominal frequency $f_{nom}$, is defined as:

$$Y = \frac{f - f_{nom}}{f_{nom}} \quad (2)$$

where f is the actual frequency of the oscillator. The relative frequency deviation Y, and its time dependency, can also be evaluated by derivation of the time error TEo, therewith obtaining the formula:

$$Y(\tau) = a + b\tau \quad (3)$$

Figure 6:
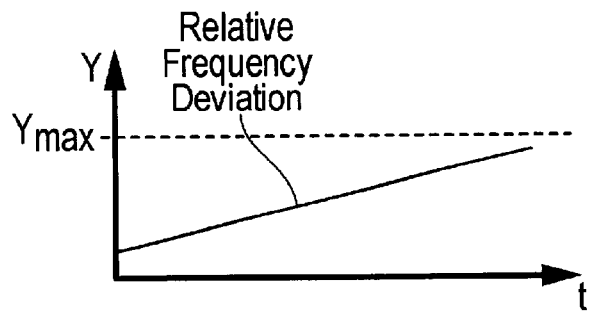
FIG. 6 is a diagrammatic illustration of the relative frequency deviation of a local oscillator.

FIG. 6 illustrates schematically the relative frequency deviation according to the formula (3).

In order to be able to make a relevant evaluation of the performance of the oscillator, it is important to distinguish between the oscillator-dependent component TEo of the time error TE and the network-dependent component TEn of said time error TE.

As illustrated in FIG. 5, an evaluation period for a local oscillator calibration can be divided into a first phase $F_1$ and a second phase $F_2$. The first phase shall include a time period $T_1$ that corresponds at least to the time taken for the time error TE to reach a magnitude at which the network-dependent component TEn will not affect deleteriously the measured relative frequency deviation Y according to formula (2).

The first phase $F_1$ is followed by the second phase $F_2$, which extends over a time period $T_2$ during which the oscillator 21 can be calibrated and adjusted. It is important in this respect to be able to choose a suitable time period $T_2$ for the second phase $F_2$ and a suitable time interval $\tau_0$ between the time stamps TS.

Because the time error increases quadratically with time, an excessively long time period $T_2$ will give a wrong image of the time error TE. An excessively long second phase $F_2$ is therefore not desirable. The second phase $F_2$ shall also be of sufficient duration such that actuation of the remaining measurement error $\bar{\epsilon}$ will not deleteriously affect the result. By remaining measurement error $\bar{\epsilon}$ is meant an error that is dependent on the network-dependent component TEn, and more specifically on variations in data packet transmission times through the delimited network.

For instance, if the contribution from the remaining measurement error $\bar{\epsilon}$ must not exceed 10%, the time period $T_2$ for the second phase $F_2$ may be chosen as:

$$T_2 > \frac{10 \times \bar{\epsilon} \times \sqrt{2}}{Y} \quad (4)$$

where the remaining measurement error $\bar{\epsilon}$ has been included two times, but where the square root has been taken on the figure two, since the measurement error varies randomly. Moreover, the duration of the second phase $F_2$ shall be sufficiently long for a desired number of time stamps TS to have time to be received and used in the evaluation of the time error TE or the relative frequency deviation Y.

The total evaluation period $T_1$ plus $T_2$ gives a calibration period during which the relative frequency deviation Y may not exceed a maximum accepted relative frequency deviation $Y_{max}$.

As a result of the slow variation of the network-dependent component TEn of the time error TE, and because this shall be considered to vary randomly, it is not possible to use an excessively short time interval $\tau_0$ between the time stamps TS, since the variation between two consecutive time stamps would then be able to include a non-random network-dependent error.

It may also be so that the total time error TE must not exceed a maximum accepted time error $TE_{max}$, such as when determining ToD or a phase error with respect to the local oscillator.

FIG. 5 shows that the second phase $F_2$ extends over a time period $T_2$ and is terminated prior to the time error TE reaching a predetermined value $TE_1$ which is smaller than or equal to a maximum accepted time error $TE_{max}$.

It is proposed in accordance with the present invention that the relative frequency deviation Y is evaluated in accordance with the following formula:

$$Y = \frac{0.006}{N\tau_0} \sum_{i=1}^{N} TE_i \left( \frac{2i}{N^2 - 1} - \frac{1}{N - 1} \right) \quad (5)$$

where N is the number of time stamps, $\tau_0$ is the time interval between transmitted time stamps, $TE_i$ is the time error at which respective time stamps are received, and $N\tau_0$ is thus the time duration $T_2$ of the second phase $F_2$.

The relative frequency deviation Y obtains a ppm (parts per million) magnitude when the time interval between the time stamps $\tau_0$ is measured in seconds (s) and the time error TE is measured in nanoseconds (ns).

In order not to subject the network excessively with traffic that is given priority over all other traffic, and to avoid the risk of the network-dependent component TEn varying randomly between the different time stamps, it is proposed in accordance with the invention that the time stamps are sent in intervals $\tau_0$ of 15 minutes to 4 hours, such as at one-hour intervals. This has also been found a suitable time interval for formula (5) when using quartz oscillators, which are normally used in telecommunications applications. It is mentioned, however, that other time intervals can be used, although one problem with a shorter time interval is that the network-dependent component of the time error cannot always be considered to vary randomly, while one problem with longer time intervals is that the requisite number of time stamps cannot be received within the calibration interval.

With a time interval $\tau_0$ of 1 hour, it is proposed that the time period $T_2$ for the second phase $F_2$ is set to at least 12 hours, preferably more than 24 hours, so as to be able to obtain a requisite number of time stamps and therewith values of the time error TE.

Figure 7:
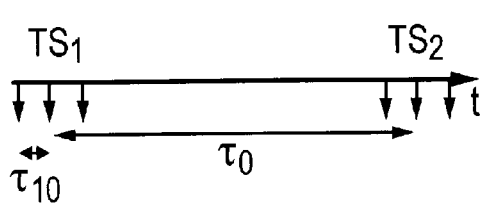
FIG. 7 shows schematically that time stamps can be sent in multiple time stamp groups.

FIG. 7 shows that it is also possible to send a group of time stamps within a short time period $\tau_{10}$ with each transmission $TS_1$, $TS_2$, such as three consecutive time stamps at a time interim of 1 second there between. This enables the measured time interval $\tau_0'$, and therewith the time error TE, to be determined with greater certainly, for instance if a time stamp is lost in transmission or if it is found that one of the three time stamps deviates considerably from the other two when measuring the time interval $\tau_0'$ relating to a preceding group of time stamps, so as to enable the remaining time stamps to be used in determining the measured time interval $\tau_0'$.

For instance, with a local oscillator that according to specification has a relative frequency deviation of below $1\cdot 10^{-9}$ per day, which corresponds to Stratum 3e, provided that the remaining measurement error $\bar{\epsilon}$ is in the order of 50 $\mu s$, and with a maximum accepted relative frequency deviation $Y_{max}$ which is $30\cdot 10^{-9}$, the first phase will take about 29 calendar days and the maximum accepted relative frequency deviation $Y_{max}$ is reached after about 30 calendar days. A suitable calibration routine would then include one adjustment per month, where the second phase $F_2$ constitutes 24 hours during the last calendar day.

Naturally, the parameters must be selected differently for acceptable calibration and adjustment in the case of an oscillator according to another Stratum level, or in the case of other network-dependent time errors.

It is also possible to evaluate the frequency drift of the local oscillator 21 when the value of this drift is used to correct the local oscillator in the event of the time stamps TS from the central time-generating unit 11 being lost. Such loss may occur, for instance, in a system fault in the main unit 1 or in the event of some form of communications error between the main unit 1 and an element 2.

Such drift D can be determined according to the formula:

$$D = \frac{0.06}{M\tau_1^2} \sum_{j=1}^{M} TE_j \left( \frac{6j^2}{M^4 - 5M^2 + 4} - \frac{6j}{M^3 - M^2 - 4M + 4} + \frac{1}{M^2 - 3M + 2} \right) \quad (6)$$

where M is the number of time stamps, $\tau_1$ is the time interval between transmitted time stamps and $TE_j$ is the time error pertaining to respective time stamps. It is also possible to use the same time intervals and the same number of time stamps as that used when evaluating the relative frequency deviation of the oscillator, in other words to allow $\tau_0$ to be equal to $\tau_1$ and M to be equal to N, although when evaluating the drift D the number of time stamps M will preferably exceed the number of time stamps N that are used when evaluating the relative frequency deviation Y of the oscillator.

It is also possible to store the results of the various calibrations and therewith obtain a characteristic value of the drift of the local oscillator for use in adjusting the oscillator 21 in the event of the time stamps TS being lost.

The present invention also relates to a possible method of initiating a new oscillator 61 belonging to an element 6 in the network A and situated in the delimited network B.

Figure 8:
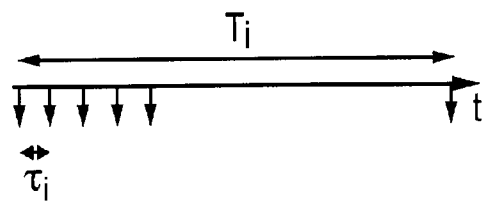
FIG. 8 illustrates an alternative time interval between time stamps that are sent for initiation of a local oscillator.

It is possible in accordance with the invention to use another time interval $\tau_i$ during, for instance, an initiating stage of a newly installed local oscillator 61, in accordance with FIG. 8.

It would then be possible to use a time interval $\tau_i$ of, e.g., 10 seconds during an initiation interval $T_i$ of, e.g., 30 minutes for an initial evaluation of the oscillator. These time stamps can be ordered through an request from the element 6 that includes the new oscillator 61 to the main unit 1, where the desired time interval $\tau_i$ and the desired initiation interval $T_i$ etc., are stated in the request.

It is also possible to allow the main unit 1 to send necessary parameters to the element 6 that includes the new oscillator 61 in the initiation of the new oscillator, such as an anticipated time interval $\tau_0$, time period $T_1$ for the first phase $F_1$, time period $T_2$ for the second phase $F_2$, and any other parameters.

Figure 9:
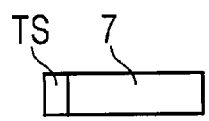
FIG. 9 illustrates schematically a time stamp that comprises one byte.

FIG. 9 shows that the time stamps TS used solely include the information necessary for them to be identified as a time stamp. Adequate marking could be achieved in accordance with the present invention with only one byte in this respect. However, this does not include information relating to absolute time.

By this is meant the information part (payload) of transmitted data information. Any address information etc 7 shall be included in accordance with the protocol used in the delimited network B. It shall be understood that the information part may also include the requisite data bits for ensuring correct transmission of the time stamp, such as one or more parity bits for parity checks or some other code for encrypting the time stamp.

Figure 10:
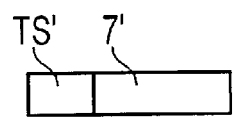
FIG. 10 illustrates schematically a time stamp that includes time information for determining absolute time.

It is also possible to use time stamps that include information relating to absolute time TS' according to FIG. 10, whereby ToD (Time of Day) can also be determined with a certain degree of uncertainty depending on the absolute delay between the main unit 1 and the element 2. It will be understood in this regard that requisite address information etc. 7' is included in addition to the information that relates directly to the time stamp TS'.

Greater ToD accuracy can be achieved when a method according to the present invention is combined with a method that functions in accordance with the Round Trip Delay such as Network Time Protocol (NTP).

The algorithms for calculating relative frequency deviation Y according to formula (5), and for calculating drift D according to formula (6), are illustrated and described in the proposal to a standard designated ANSI T1.101-1998 "Draft American National Standard for Telecommunications—Synchronization Interface Standard" in part 8.2 "Performance of clocks during reference failure".

It will be understood, however, that the described use of these formulae has a purpose different to that intended by the present invention. For instance, certain parameters must be adapted to the present invention as described in the aforegoing, in order to enable the formulae to be used in accordance with the invention.

Figure 11:
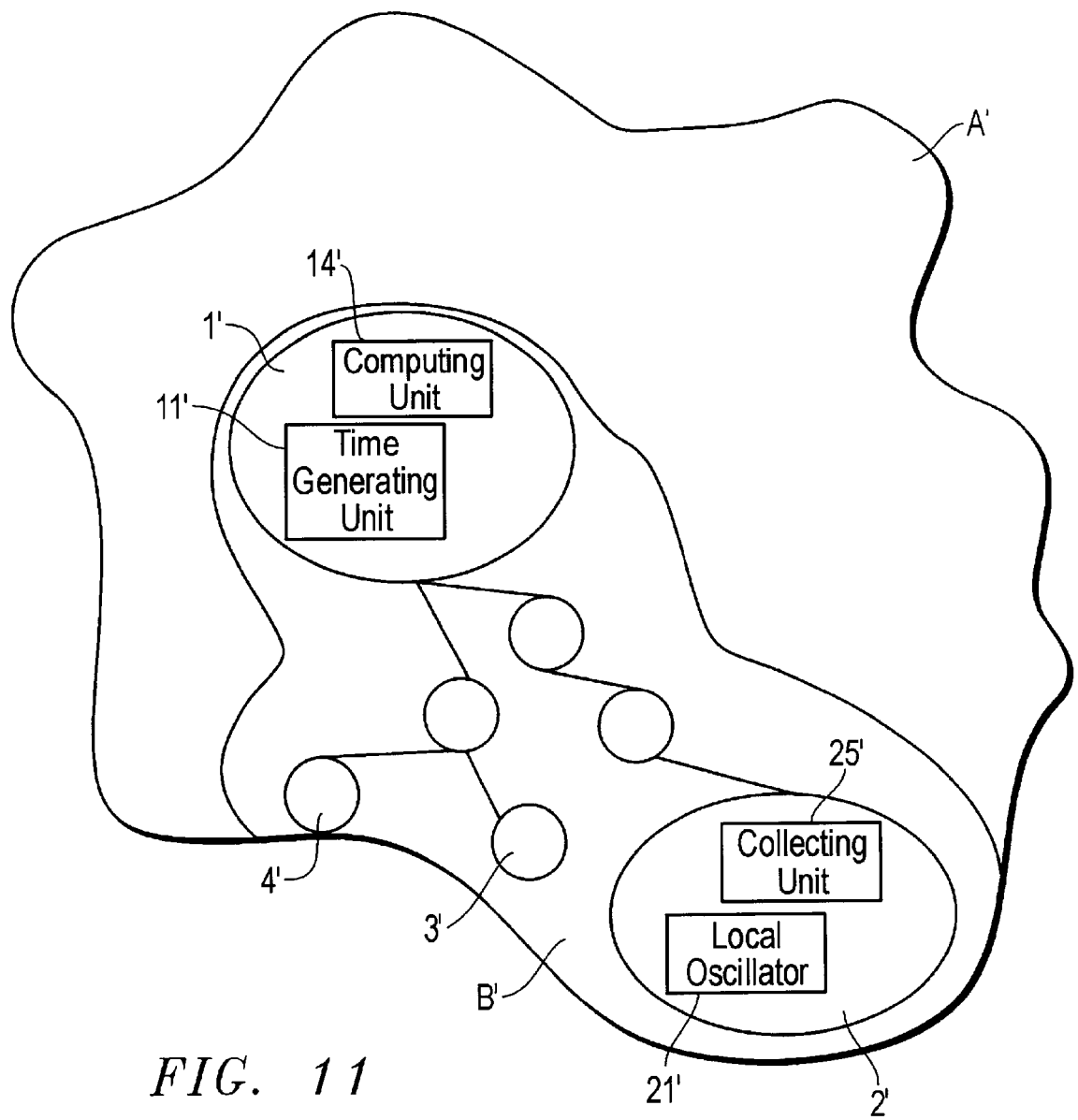
FIG. 11 illustrates schematically an alternative embodiment in which the main unit carries out necessary calculations.

As illustrated in FIG. 11, it is also possible to allow an element 2' to collect during the second phase $F_2$ the information required to carry out calibration, and then send this information to a main unit 1' which performs calculations in accordance with the aforegoing and then sends to the element 2' a value for adjustment of the oscillator 21', wherewith said element 2' then carries out the adjustment.

This means that the main unit 1 is able to carry out computations for all concerned elements 2', 3', 4' and that the elements need not include means for or to use capacity for the requisite computations.

However, this embodiment will result in a higher traffic load on the delimited network B'.

With the intention of ensuring that the main unit 1 will have a reliable time reference, it is proposed in accordance with the invention that the time-generating unit 11 includes a GPS receiver 13 through which the time reference for the time stamps TS is obtained. However, this is only a proposed embodiment and there is nothing to prevent the reference being obtained in some other reliable fashion.

The present invention also relates to an arrangement, which is described in the following text. This arrangement is able to function in accordance with the aforedescribed method and where the arrangement is not fully described, reference is made to the corresponding description of the method for a better understanding of the arrangement.

Referring back to FIGS. 1, 2 and 3, there is shown an inventive arrangement intended for enabling at least one local oscillator 21 to be synchronised with a central time-generating unit, where the local oscillator 21 is adapted to serve a so-called element 1 included in a network A, and where the time-generating unit 11 is included in a so-called main unit 1.

The frequency of the local oscillator 21 can be controlled by periodic and automatic calibration.

With a starting point from one such arrangement, it is proposed in accordance with the present invention that the main unit 1 will include a transmitting unit 12 which is adapted to transmit a time stamp generated by the time-generating unit 11 at pre-defined time intervals $\tau_0$.

It is also proposed that the transmitting unit 12 is adapted to transmit the time stamp by general transmission (broadcasting) to a receiving unit 23 affiliated with respective elements in a part of the network that includes the main unit 1 and concerned elements 2, 3, 4, said network part being referred to here as a delimited network B.

The physical requirements within this delimited network B are so well defined that the transmission time of a time stamp sent from the transmitting unit 12 to respective elements 2, 3, 4 will be known to respective elements with a given degree of certainty.

A calibrating unit 22 belonging to the element 2 is adapted to calibrate the local oscillator 21 with the aid of the mutual arrival times of the time stamps together with the known transmission time relating to the element 2.

It is possible to learn the transmission times to respective elements 2, 3, 4 since nodes 51, 52, 53 included in the delimited network B are adapted to give the highest priority to the time stamps $TS_1$, $TS_2$, $TS_3$, . . . , $TS_n$ over all other information transmissions.

As illustrated in FIG. 4, the transmitting unit 12 is adapted to transmit time stamps $TS_1$, $TS_2$, $TS_3$, . . . , $TS_n$ in the pre-defined interval $\tau_0$.

The calibrating unit 22 is also adapted to use a mathematical method for oscillator calibration, where variation in the arrival times of the time stamps can be used in said calibration. This variation can be described as a time error that constitutes the difference between the pre-defined, and therewith expected, time interval $\tau_0$ between the time stamps and the actual time interval $\tau_0'$ between received time stamps, wherein said local oscillator 21 is adapted to measure this actual time interval $\tau'$.

The calibrating unit 21 is also adapted to divide the time error TE into an oscillator-dependent component TEo and a network-dependent component TEn, where the oscillator-dependent component TEo can be determined by the characteristic of the local oscillator 21, and the network-dependent component TEn can be determined by the variations in the transmission times from the transmitting unit 12 to the receiving unit 23 for respective time stamps TS and possible measuring errors in the measuring method used.

According to FIG. 5, the calibrating unit 22 is adapted to divide an evaluation period for calibration of a local oscillator 21 into a first phase $F_1$ and a second phase $F_2$.

The calibrating unit 22 is adapted to allow the first phase to continue over at least a time period $T_1$, until the measured relative frequency deviation Y will have no deleterious affect on the network-dependent component TEn of the time error TE.

The second phase is commenced by the calibrating unit 22 immediately after the first phase. The evaluating unit 22a is adapted to evaluate the time error TE continuously during the second phase $F_2$, and the calibrating unit 22 is adapted to terminate the second phase $F_2$ with calibration and adjustment of the local oscillator 21.

According to the present invention, the calibrating unit 22 is adapted to terminate the second phase $F_2$ at the end of a time period $T_2$ and before the relative frequency deviation Y reaches a maximum accepted relative frequency deviation $Y_{max}$, or before the time error TE reaches a predetermined value $TE_1$ which is smaller than or equal to a maximum accepted time error $TE_{max}$.

The calibrating unit 22 is adapted to evaluate the relative frequency deviation Y for the local oscillator 21 in accordance with formula (5).

The time-generating unit 11 and the transmitting unit 12 are adapted to generate and transmit the time stamps in intervals $\tau_0$ of from 15 minutes to 4 hours, such as at one-hour intervals.

When using quartz oscillators, which are normally used in telecommunications applications, it has been found that a suitable time interval with respect to formula (5) and with a residual measurement error $\bar{\epsilon}$ is in the order of 50 $\mu s$ and with a maximum accepted relative frequency deviation $Y_{max}$ of $30 \cdot 10^{-9}$. The given intervals can be chosen differently, when an oscillator of another Stratum level is used, or when the network-dependent error component TEn is changed, and therewith also the residual measurement error.

The aforedescribed time intervals, however, are suitable with respect to the variations of the network-dependent error component TEn and the load on the network A.

The transmitting unit 12 may also be adapted to send a group of time stamps with a short period $\tau_0$, such as three consecutive time stamps each at a one-second interval as shown in FIG. 7. Conveniently, the calibrating unit 22 is adapted to use these three time stamps to ensure that a relevant value of the measured time interval $\tau_0'$ is obtained.

The evaluating unit 22a may also be adapted to evaluate the frequency drift of the local oscillator 21, according to formula (6). The value of this drift can then be stored in a storage space 24 available to the calibrating unit 22.

It is also possible to allow the results of earlier calibrations to be stored in the memory space 24.

In anyone of these embodiments, it is possible to allow the calibrating unit 22 to use the value stored in the storage space 24 for adjustment of the local oscillator 21, in the event of the time stamps sent from the central time-generating unit 11 being lost.

The present invention also provides the possibility of initiating a new oscillator in an element 6 in the delimited network B.

It is then possible to use another time interval $\tau_i$ according to the FIG. 8 illustration, for instance during an initiating stage of a newly installed local oscillator 61. It would then be possible to allow the time-generating unit 11 to generate time stamps TS in a time interval $\tau_i$ of, e.g., 10 seconds during an initiation interval $T_i$ of, for instance, 30 minutes for initial evaluation of the new oscillator.

According to the present invention, the element 6 that includes the new oscillator 61 is adapted to order these time stamps by sending to the main unit 1 a request stating that the desired time interval $\tau_i$, the desired initiation interval $T_i$, etc.

It is also possible to allow the main unit 1 to be adapted to transmit necessary parameters to the element 6 when initiating said new oscillator 61, such as anticipated time intervals $\tau_0$, time periods $T_1$ for the first phase $F_1$, time period $T_2$ for the second phase $F_2$, and any other parameters.

The generating unit 11 is adapted to generate time stamps TS that include necessary time stamp identification information. According to the present invention, one byte should be sufficient to constitute an adequate marking, as shown in FIG. 9. However, this includes no information relating to absolute time.

By this is meant the information part of transmitted data information, which may also include data bits necessary to ensure that the time stamp will be correctly transmitted, such as parity bits for a time stamp parity check, or a code for encrypting said time stamp. Any address information (header) etc. 7 shall be included in accordance with the protocol used in the delimited network B.

As shown in FIG. 10, the generating unit 11 may also be adapted to generate time stamps TS' which also include information relating to absolute time, and which also enable ToD (Time of Day) to be determined to a given degree of uncertainty depending on the network-dependent component of the time error TEn. It will be understood that the requisite address information etc. 7' is included in addition to the information that relates directly to the time stamp TS'.

An inventive arrangement can be adapted to provide greater ToD accuracy, by causing said arrangement to operate in accordance with the Round Trip Delay principle, such as NTP, in combination with the aforedescribed.

As shown in FIG. 11, a collecting unit 25' belonging to an element 2' may be adapted to collect necessary calibration information during the second phase $F_2$ and then send this information to a main unit 1'.

The main unit will then include a computing unit 14' that can perform computations in accordance with the aforegoing and then send to the element 2' a value for adjustment of the local oscillator 21', where after said element 2' functions to carry out this adjustment.

This enables the main unit 1 to perform computations for all concerned elements 2', 3', 4', wherewith the elements need not include means for the requisite computations nor yet use capacity to this end. This embodiment, however, results in a higher traffic load on the delimited network B'.

According to one proposed embodiment, the time-generating unit 11 may include a GPS receiver 13 with which the time reference for the time stamps can be obtained.

According to a further proposed embodiment, the local oscillator 21 may be a voltage-controlled oscillator that enables the frequency of the oscillator to be adjusted, by adjusting the reference voltage of the voltage-controlled oscillator.

It will be understood that the invention is not restricted to the aforedescribed and illustrated embodiment, and that modifications can be made within the scope of the inventive concept as illustrated in the accompanying Claims.

What is claimed is:

1. A method of synchronizing at least one local oscillator with a central time-generating unit, where said local oscillator serves an element included in a network, and where said time-generating unit is included in a main unit which is also included in said network, comprising the steps of:

controlling the frequency of said local oscillator by periodic and automatic calibration, wherein the time-generating unit sends a time stamp at pre-defined time intervals;

evaluating the transmission time of said time stamp from said main unit to a respective element with a given degree of certainty by evaluating against well defined physical requirements of that part of said network including said main unit and said elements, and wherein the network is a delimited network; and, using the inter-arrival time of the time stamps to calibrate the local oscillator together with a known transmission time, wherein said transmission time is evaluated with necessary certainty by giving said time stamps the highest priority over all other information transmissions within said delimited network.

2. A method according to claim 1, wherein said time stamp is transmitted in a general broadcast to all elements in said delimited network.

3. A method according to claim 1, wherein a group of time stamps is transmitted within a short time period at each transmission.

4. A method according to claim 1, wherein said time stamps are sent at intervals of from 15 minutes to 4 hours.

5. A method of synchronizing at least one local oscillator with a central time-generating unit, where said local oscillator serves an element included in a network, and where said time-generating unit is included in a main unit which is also included in said network, comprising the steps of:

controlling the frequency of said local oscillator by periodic and automatic calibration, wherein the time-generating unit sends a time stamp at pre-defined time intervals;

evaluating the transmission time of said time stamp from said main unit to a respective element with a given degree of certainty by evaluating against well defined physical requirements of that part of said network including said main unit and said elements, and wherein the network is a delimited network; and using the inter-arrival time of the time stamps to calibrate the local oscillator together with a known transmission time, wherein a mathematical method in which the arrival times of said time stamps are used to effect said calibration, wherein variations are described in a time error which constitutes the difference between said pre-defined and the actual time interval between received time stamps measured by said local oscillator, wherein said time error is divided into an oscillator-dependent component and a network-dependent component;

wherein said oscillator-dependent component is determined by the characteristic of said local oscillator;

wherein said network-dependent component is determined by the variations in transmission times from said time-generating unit to said elements for respective time stamps and any measurement error of the measuring method used;

wherein an evaluation period for calibration of a local oscillator is divided into a first phase and a second phase;

wherein said first phase is continued at least until said network-dependent component no longer has a deleterious effect on a calculation of the relative synchronizing frequency deviation of said local oscillator;

wherein said second phase is commenced immediately after said first phase;

wherein said second phase includes continuous evaluation of said time error; and, wherein said second phase is terminated with calibration and adjustment of said local oscillator.

6. A method according to claim 5, wherein said second phase is terminated before the relative frequency deviation of said local oscillator reaches a maximum accepted relative frequency deviation.

7. A method according to claim 5, wherein said second phase is terminated before said time error reaches a predetermined value that is smaller than or equal to a maximum accepted time error.

8. A method of synchronizing at least one local oscillator with a central time-generating unit, where said local oscillator serves an element included in a network, and where said time-generating unit is included in a main unit which is also included in said network, comprising the steps of:

controlling the frequency of said local oscillator by periodic and automatic calibration, wherein the time-generating unit sends a time stamp at pre-defined time intervals;

evaluating the transmission time of said time stamp from said main unit to a respective element with a given degree of certainty by evaluating against well defined physical requirements of that part of said network including said main unit and said elements, and wherein the network is a delimited network; and using the inter-arrival time of the time stamps to calibrate the local oscillator together with a known transmission time wherein a mathematical method in which the arrival times of said time stamps are used to effect said calibration, wherein variations are described in a time error which constitutes the difference between said pre-defined and the actual time interval between received time stamps measured by said local oscillator, wherein said mathematical method includes an evaluation of the relative frequency deviation of said local oscillator in accordance with the formula $$Y = \frac{0.006}{N\tau_0} \sum_{i=1}^{N} TE_i \left( \frac{2i}{N^2 - 1} - \frac{1}{N - 1} \right)$$

where Y is the relative frequency deviation, N is the number of time stamps received, $\tau_0$ is the time interval between transmitted time stamps, $TE_i$ is the time error at respective received time stamps, and where $N\tau_0$ is thus the time duration of said phase.

9. A method of synchronizing at least one local oscillator with a central time-generating unit, where said local oscillator serves an element included in a network, and where said time-generating unit is included in a main unit which is also included in said network, comprising the steps of:

controlling the frequency of said local oscillator by periodic and automatic calibration, wherein the time-generating unit sends a time stamp at pre-defined time intervals;

evaluating the transmission time of said time stamp from said main unit to a respective element with a given degree of certainty by evaluating against well defined physical requirements of that part of said network including said main unit and said elements, and wherein the network is a delimited network; and using the inter-arrival time of the time stamps to calibrate the local oscillator together with a known transmission time, further comprising the step of: evaluating the drift in frequency of said local oscillator; and using said drift for correcting said local oscillator in the event of the time stamps from said central time-generating unit being lost.

10. A method according to claim 9, wherein the drift evaluated in accordance with the following formula:

$$D = \frac{0.06}{M\tau_1^2} \sum_{j=1}^{M} TE_j \left( \frac{6j^2}{M^4 - 5M^2 + 4} - \frac{6j}{M^3 - M^2 - 4M + 4} + \frac{1}{M^2 - 3M + 2} \right)$$

where D is the drift of the local oscillator, M is the number of time stamps, $\tau_1$ is the time interval between transmitted time stamps, and $TE_j$ is the time error pertaining to respective time stamps.

11. A method of synchronizing at least one local oscillator with a central time-generating unit, where said local oscillator serves an element included in a network, and where said time-generating unit is included in a main unit which is also included in said network, comprising the steps of:

controlling the frequency of said local oscillator by periodic and automatic calibration, wherein the time-generating unit sends a time stamp at pre-defined time intervals;

evaluating the transmission time of said time stamp from said main unit to a respective element with a given degree of certainty by evaluating against well defined physical requirements of that part of said network including said main unit and said elements, and wherein the network is a delimited network; and using the inter-arrival time of the time stamps to calibrate the local oscillator together with a known transmission time, further comprising the step of: storing the results of the various calibrations so as to obtain a value characteristic of the drift of said local oscillator for use in adjusting said oscillator in the event of the time stamps from the central time-generating unit being lost.

12. A method of synchronizing at least one local oscillator with a central time-generating unit, where said local oscillator serves an element included in a network, and where said time-generating unit is included in a main unit which is also included in said network, comprising the steps of:

controlling the frequency of said local oscillator by periodic and automatic calibration, wherein the time-generating unit sends a time stamp at pre-defined time intervals;

evaluating the transmission time of said time stamp from said main unit to a respective element with a given degree of certainty by evaluating against well defined physical requirements of that part of said network including said main unit and said elements, and wherein the network is a delimited network; and using the inter-arrival time of the time stamps to calibrate the local oscillator together with a known transmission time, further comprising the step of: using a time interval between transmitted time stamps that is much shorter than the time interval for transmitting time stamps in a calibration process, for initially evaluating an oscillator in the initiation of a new oscillator belonging to an element in said delimited network during an initiation interval for said new local oscillator.

13. A method according to claim 12 wherein said time interval is 10 seconds; and wherein said initiation interval is 30 minutes.

14. A method according to claim 12, wherein said time stamps are ordered from the element that includes said new oscillator to said main unit, through the medium of a request stating the desired time interval, the desired initiation interval.

15. A method of synchronizing at least one local oscillator with a central time-generating unit, where said local oscillator serves an element included in a network, and where said time-generating unit is included in a main unit which is also included in said network, comprising the steps of:

controlling the frequency of said local oscillator by periodic and automatic calibration, wherein the time-generating unit sends a time stamp at pre-defined time intervals;

evaluating the transmission time of said time stamp from said main unit to a respective element with a given degree of certainty by evaluating against well defined physical requirements of that part of said network including said main unit and said elements, and wherein the network is a delimited network; and, using the inter-arrival time of the time stamps to calibrate the local oscillator together with a known transmission time, wherein upon an initiation of a new oscillator, the main unit sends requisite parameters to the element that includes said new oscillator, the requisite parameters include at least anticipated time intervals between transmitted time stamps, time period for a first phase, and time period for a second phase.

16. A method of synchronizing at least one local oscillator with a central time-generating unit, where said local oscillator serves an element included in a network, and where said time-generating unit is included in a main unit which is also included in said network, comprising the steps of:

controlling the frequency of said local oscillator by periodic and automatic calibration, wherein the time-generating unit sends a time stamp at pre-defined time intervals;

evaluating the transmission time of said time stamp from said main unit to a respective element with a given degree of certainty by evaluating against well defined physical requirements of that part of said network including said main unit and said elements, and wherein the network is a delimited network; and using the inter-arrival time of the time stamps to calibrate the local oscillator together with a known transmission time, wherein said elements collect information required to effect a calibration during a second phase; wherein said elements send this information to said main unit; wherein said main unit performs the computations necessary to produce a value for calibration of said local oscillator; wherein said main unit sends to said element a local oscillator adjustment value; and wherein said element makes the necessary adjustment.

17. An arrangement for synchronizing at least one local oscillator with a central time-generating unit, where said local oscillator is adapted to serve an element included in a network, where said time-generating unit is included in a main unit included in said network, and where the arrangement comprises:

means for controlling the frequency of said local oscillator by periodic and automatic calibration;

a main unit that includes a transmitting unit and said transmitting unit is adapted to transmit a time stamp generated by said time-generating unit at a predefined time intervals;

means for evaluating the transmission time of said time stamp from said main unit to a respective element with a given degree of certainty by evaluating against well defined physical requirements of that part of said network including said main unit and said element and referred to as a delimited network; and, a calibrating unit belonging to said element is adapted to calibrate said local oscillator with the aid of the inter-arrival time of the time stamps together with a known transmission time, wherein said nodes included in said delimited network are adapted to give said time stamps the highest priority over all other information transmissions, whereby said known transmission time is evaluated with certainty.

18. An arrangement for synchronizing at least one local oscillator with a central time-generating unit, where said local oscillator is adapted to serve an element included in a network, where said time-generating unit is included in a main unit included in said network, and where the arrangement comprises:

means for controlling the frequency of said local oscillator by periodic and automatic calibration;

a main unit that includes a transmitting unit and said transmitting unit is adapted to transmit a time stamp generated by said time-generating unit at a predefined time intervals;

means for evaluating the transmission time of said time stamp from said main unit to a respective element with a given degree of certainty by evaluating against well defined physical requirements of that part of said network including said main unit and said element and referred to as a delimited network;

a calibrating unit belonging to said element is adapted to calibrate said local oscillator with the aid of the inter-arrival time of the time stamps together with a known transmission time wherein said calibrating unit is adapted to use a mathematical oscillator calibration method which uses the arrival times of said time stamps in said calibration;

wherein said variations are time errors that constitutes the difference between pre-defined time intervals and the actual time interval between received time stamps; and wherein said local oscillator is adapted to measure said actual time interval, wherein said calibrating unit is adapted to divide said time error into an oscillator-dependent component and a network-dependent component;

wherein said oscillator-dependent component can be determined on the basis of the local oscillator characteristic;

wherein said network-dependent component can be determined by the variations in transmission times from said transmitting unit to said receiving unit for respective time stamps and possible measuring errors of the measuring method used;

wherein said calibrating unit is adapted to divide an evaluating period for calibration of a local oscillator into a first phase and a second phase;

wherein said calibrating unit is adapted to allow said first phase to continue at least until said network-dependent component no longer has any deleterious affect on a calculation of the relative frequency deviation of said local oscillator;

wherein said calibrating unit is adapted to commence said second phase immediately after said first phase;

wherein said calibrating unit includes an evaluating unit which is adapted to evaluate said time error continuously during said second phase; and, wherein said calibrating unit is adapted to terminate said second phase with calibration and adjustment of said local oscillator.

19. An arrangement according to claim 18, wherein said calibrating unit is adapted to terminate said second phase before the relative frequency deviation of said local oscillator reaches a maximum accepted relative frequency deviation.

20. An arrangement according to claim 18, wherein said calibrating unit is adapted to terminate said second phase before said time error reaches a predetermined value that is smaller than or equal to a maximum accepted time error.

21. An arrangement for synchronizing at least one local oscillator with a central time-generating unit, where said local oscillator is adapted to serve an element included in a network, where said time-generating unit is included in a main unit included in said network, and where the arrangement comprises:

means for controlling the frequency of said local oscillator by periodic and automatic calibration;

a main unit that includes a transmitting unit and said transmitting unit is adapted to transmit a time stamp generated by said time-generating unit at a predefined time intervals;

means for evaluating the transmission time of said time stamp from said main unit to a respective element with a given degree of certainty by evaluating against well defined physical requirements of that part of said network including said main unit and said element and referred to as a delimited network;

a calibrating unit belonging to said element is adapted to calibrate said local oscillator with the aid of the inter-arrival time of the time stamps together with a known transmission time wherein said calibrating unit is adapted to use a mathematical oscillator calibration method which uses the arrival times of said time stamps in said calibration;

wherein said variations are time errors that constitutes the difference between pre-defined time intervals and the actual time interval between received time stamps; and, wherein said local oscillator is adapted to measure said actual time interval, wherein said calibrating unit is adapted to evaluate the relative frequency deviation of said local oscillator by means of a mathematical method according to the formula $$Y = \frac{0.006}{N\tau_0} \sum_{i=1}^{N} TE_i \left( \frac{2i}{N^2 - 1} - \frac{1}{N - 1} \right)$$

where Y is the relative frequency deviation, N is the number of time stamps received, $\tau_0$ is the time interval between transmitted time stamps, $TE_i$ is the time error at which respective time stamps are received, and where $N\tau_0$ is thus the time duration of said second phase.

22. An arrangement for synchronizing at least one local oscillator with a central time-generating unit, where said local oscillator is adapted to serve an element included in a network, where said time-generating unit is included in a main unit included in said network, and where the arrangement comprises:

means for controlling the frequency of said local oscillator by periodic and automatic calibration;

a main unit that includes a transmitting unit and said transmitting unit is adapted to transmit a time stamp generated by said time-generating unit at a predefined time intervals;

means for evaluating the transmission time of said time stamp from said main unit to a respective element with a given degree of certainty by evaluating against well defined physical requirements of that part of said network including said main unit and said element and referred to as a delimited network;

a calibrating unit belonging to said element is adapted to calibrate said local oscillator with the aid of the inter-arrival time of the time stamps together with a known transmission time, wherein said evaluating unit is adapted to evaluate the drift in frequency of said local oscillator;

wherein the value of said drift can be stored in a storage space that is available to said calibrating unit; and wherein said calibrating unit is adapted to use said stored value for correcting or adjusting the local oscillator when the time stamps from the central generating unit are lost.

23. An arrangement according to claim 22, wherein said evaluating unit is adapted to evaluate said drift in accordance with the following formula:

$$D = \frac{0,06}{M\tau_1^2} \sum_{j=1}^{M} TE_j \left( \frac{6j^2}{M^4 - 5M^2 + 4} - \frac{6j}{M^3 - M^2 - 4M + 4} + \frac{1}{M^2 - 3M + 2} \right)$$

where D is the drift of the local oscillator, M is the number of time stamps, $\tau_1$ is the time interval between transmitted time stamps, and $TE_j$ is the time error relating to respective time stamps.

24. An arrangement for synchronizing at least one local oscillator with a central time-generating unit, where said local oscillator is adapted to serve an element included in a network, where said time-generating unit is included in a main unit included in said network, and where the arrangement comprises:

means for controlling the frequency of said local oscillator by periodic and automatic calibration;

a main unit that includes a transmitting unit and said transmitting unit is adapted to transmit a time stamp generated by said time-generating unit at a predefined time intervals;

means for evaluating the transmission time of said time stamp from said main unit to a respective element with a given degree of certainty by evaluating against well defined physical requirements of that part of said network including said main unit and said element and referred to as a delimited network;

a calibrating unit belonging to said element is adapted to calibrate said local oscillator with the aid of the inter-arrival time of the time stamps together with a known transmission time, wherein said calibrating unit is adapted to store the results of different calibrations in a storage space; and wherein the calibrating unit is adapted to use the stored results for adjusting said oscillators in the event of the time stamps from said central time-generating unit being lost.

25. An arrangement for synchronizing at least one local oscillator with a central time-generating unit, where said local oscillator is adapted to serve an element included in a network, where said time-generating unit is included in a main unit included in said network, and where the arrangement comprises:

means for controlling the frequency of said local oscillator by periodic and automatic calibration;

a main unit that includes a transmitting unit and said transmitting unit is adapted to transmit a time stamp generated by said time-generating unit at a predefined time intervals;

means for evaluating the transmission time of said time stamp from said main unit to a respective element with a given degree of certainty by evaluating against well defined physical requirements of that part of said network including said main unit and said element and referred to as a delimited network; and, a calibrating unit belonging to said element is adapted to calibrate said local oscillator with the aid of the inter-arrival time of the time stamps together with a known transmission time, wherein said time-generating unit is adapted to generate time stamps at a time interval between transmitted time stamps that is much shorter than the time interval for transmitted time stamps in a calibrating process, during an initial stage of a new oscillator belonging to an element included in said delimited work.

26. An arrangement according to claim 25, wherein said time interval is adapted to 10 seconds, and wherein said initiation interval is adapted to 30 minutes.

27. An arrangement according to claim 25, wherein the element that includes said new oscillator is adapted to order said time stamps in a request to said main unit, said request stating desired time intervals and desired initiation intervals.

28. An arrangement for synchronizing at least one local oscillator with a central time-generating unit, where said local oscillator is adapted to serve an element included in a network, where said time-generating unit is included in a main unit included in said network, and where the arrangement comprises:

means for controlling the frequency of said local oscillator by periodic and automatic calibration;

a main unit that includes a transmitting unit and said transmitting unit is adapted to transmit a time stamp generated by said time-generating unit at a predefined time intervals;

means for evaluating the transmission time of said time stamp from said main unit to a respective element with a given degree of certainty by evaluating against well defined physical requirements of that part of said network including said main unit and said element and referred to as a delimited network; and, a calibrating unit belonging to said element is adapted to calibrate said local oscillator with the aid of the inter-arrival time of the time stamps together with a known transmission time, wherein upon an initiation of a new oscillator said main unit functions to send necessary parameters to the element that includes said new oscillator as anticipated time intervals between transmitted time stamps, first phase time periods and second phase time periods.

29. An arrangement for synchronizing at least one local oscillator with a central time-generating unit, where said local oscillator is adapted to serve an element included in a network, where said time-generating unit is included in a main unit included in said network, and where the arrangement comprises:

means for controlling the frequency of said local oscillator by periodic and automatic calibration;

a main unit that includes a transmitting unit and said transmitting unit is adapted to transmit a time stamp generated by said time-generating unit at a predefined time intervals;

means for evaluating the transmission time of said time stamp from said main unit to a respective element with a given degree of certainty by evaluating against well defined physical requirements of that part of said network including said main unit and said element and referred to as a delimited network;

a calibrating unit belonging to said element is adapted to calibrate said local oscillator with the aid of the inter-arrival time of the time stamps together with a known transmission time, wherein said element includes a collecting unit;

wherein said collecting unit is adapted to collect information required to effect calibration during a second phase and to send this information to said main unit;

wherein said main unit includes a computing unit which is adapted to perform computations necessary to obtain a local oscillator calibrating value and to send said value to said element; and wherein said element is adapted to effect necessary adjustment in accordance with the value received.

30. A method of synchronizing at least one local oscillator with a central time-generating unit, comprising the steps of:

transmitting a time stamp at predefined time intervals, wherein said transmitting is performed by said time-generating unit;

evaluating the transmission of said time stamp, according to physical requirements of a communication network which comprises said at least one local oscillator and said central time-generating unit;

calibrating said at least one local oscillator according to said time stamp and a known transmission time wherein said step of transmitting comprises transmitting a group of time stamps within a short time period wherein said step of calibrating further comprises:

determining time error variations, which comprise the difference between a pre-defined time interval between each time stamp of said group of time stamps and actual time intervals between received time stamps of said group of time stamps as measured by said local oscillator, wherein said step of calibrating further comprises:

analyzing an oscillator-dependent component and a network-dependent component of said time error, wherein said network-dependent component is determined by variations in transmission times of said time stamps from said time generating unit to said oscillators and any measurement error of the measuring method used.

31. The method of claim 30, wherein said step of calibrating further comprises an evaluation period divided into a first and a second phase;

wherein said first phase is continued at least until said network-dependent component no longer has a negative effect on a calculation of a relative frequency deviation of said local oscillator; and wherein said second phase is commenced immediately after said first phase, includes an evaluation of said time error, and is terminated with adjustment of said local oscillator.

32. The method of claim 31, wherein said step of calibrating further comprises terminating said second phase of said evaluation period before the relative frequency deviation of said local oscillator reaches a maximum accepted relative frequency deviation.

33. The method of claim 31, wherein said second phase of said evaluation period is terminated before said time error reaches a predetermined value equal to or less than a maximum accepted time error.

34. A method of synchronizing at least one local oscillator with a central time-generating unit, comprising the steps of:

transmitting a time stamp at predefined time intervals, wherein said transmitting is performed by said time-generating unit;

evaluating the transmission of said time stamp, according to physical requirements of a communication network which comprises said at least one local oscillator and said central time-generating unit; and calibrating said at least one local oscillator according to said time stamp and a known transmission time wherein said step of transmitting comprises transmitting a group of time stamps within a short time period wherein said step of calibrating further comprises:

determining time error variations, which comprise the difference between a pre-defined time interval between each time stamp of said group of time stamps and actual time intervals between received time stamps of said group of time stamps as measured by said local oscillator, wherein said step of evaluating comprises evaluating a relative frequency deviation of said local oscillator using the following formula:

$$Y = \frac{0.006}{N\tau_0} \sum_{i=1}^{N} TE_i \left( \frac{2i}{N^2 - 1} - \frac{1}{N - 1} \right);$$

where Y represents the relative frequency deviation, n represents the number of time stamps received, $\tau_0$ represents the time interval between transmitted time stamps, $TE_i$ represents the time error at various received time stamps, and where $N\tau_0$ represents the time duration of the second phase.

35. A method of synchronizing at least one local oscillator with a central time-generating unit, comprising the steps of:

transmitting a time stamp at predefined time intervals, wherein said transmitting is performed by said time-generating unit;

evaluating the transmission of said time stamp, according to physical requirements of a communication network which comprises said at least one local oscillator and said central time-generating unit; and calibrating said at least one local oscillator according to said time stamp and a known transmission time, wherein said step of evaluating comprises evaluating a drift in frequency of said local oscillator, and said step of calibrating comprises utilizing said drift for correcting said local oscillator.

36. The method of claim 35, wherein said drift in frequency is evaluated using the following formula:

$$D = \frac{0.06}{M\tau_1^2} \sum_{j=1}^{M} TE_i \left( \frac{6j^2}{M^4 - 5M^2 + 4} - \frac{6j}{M^3 - M^2 - 4M + 4} + \frac{1}{M^2 - 3M + 2} \right)$$

where D represents the drift in frequency of the local oscillator, M represents the number of time stamps, $\tau_1$ represents the time interval between transmitted time stamps, and $TE_j$ represents the time error of various time stamps.

37. A method of synchronizing at least one local oscillator with a central time-generating unit, comprising the steps of:

transmitting a time stamp at predefined time intervals, wherein said transmitting is performed by said time-generating unit;

evaluating the transmission of said time stamp, according to physical requirements of a communication network which comprises said at least one local oscillator and said central time-generating unit;

calibrating said at least one local oscillator according to said time stamp and a known transmission time; and storing results of various calibrations performed according to said calibrating step in order to obtain a value characteristic of a drift in frequency of said local oscillator.

38. The method of claim 37, further comprising the step of:

adjusting said local oscillator according to said results stored in said step of storing in the event that said time stamps transmitted in said transmitting step are temporarily not received.

39. A method for evaluating a relative frequency deviation of a local oscillator utilizing time stamps received from time stamps transmitted by a time-generating unit at predefined time intervals, wherein said evaluation is defined by the following formula $$Y = \frac{0.006}{N\tau_0} \sum_{i=1}^{N} TE_i \left( \frac{2i}{N^2 - 1} - \frac{1}{N - 1} \right)$$

wherein Y represents a relative frequency deviation, N represents a number of time stamps received, $\tau_0$ represents a time interval between transmitted time stamps, $TE_i$ represents a time error of received time stamps, and $N\tau_0$ represents a continuous evaluation period of the time error.

40. A method for calculating drift in frequency of a local oscillator according to time stamps received from time stamps transmitted by a time-generating unit at predetermined time intervals, wherein the said drift in frequency is defined by the following formula:

$$D = \frac{0.06}{M\tau_1^2} \sum_{j=1}^{M} TE_i \left( \frac{6j^2}{M^4 - 5M^2 + 4} - \frac{6j}{M^3 - M^2 - 4M + 4} + \frac{1}{M^2 - 3M + 2} \right)$$

where D represents the drift in frequency of a local oscillator, M represents a number of time stamps, $\tau_1$ represents a time interval between transmitted time stamps, and $TE_j$ represents a time error of respective time stamps.

* * * * *